United States Patent
Champagne

(10) Patent No.: US 7,502,860 B1
(45) Date of Patent: Mar. 10, 2009

(54) METHOD AND APPARATUS FOR CLIENT-SIDE FLOW CONTROL IN A TRANSPORT PROTOCOL

(75) Inventor: Jean-Philippe Champagne, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 671 days.

(21) Appl. No.: 10/106,127

(22) Filed: Mar. 14, 2002

Related U.S. Application Data

(63) Continuation-in-part of application No. 09/901,523, filed on Jul. 9, 2001.

(51) Int. Cl.
*G06F 15/16* (2006.01)
*G01R 31/08* (2006.01)

(52) U.S. Cl. .................. 709/227; 709/227; 370/252
(58) Field of Classification Search ......... 709/223–224, 709/227–237; 370/252–253, 465
See application file for complete search history.

(56) References Cited

U.S. PATENT DOCUMENTS

| | | | | |
|---|---|---|---|---|
| 6,038,606 | A * | 3/2000 | Brooks et al. ............... 709/235 |
| 6,065,117 | A * | 5/2000 | White .......................... 713/159 |
| 6,081,807 | A * | 6/2000 | Story et al. .................. 707/101 |
| 6,092,110 | A * | 7/2000 | Maria et al. ................. 709/225 |
| 6,301,249 | B1 * | 10/2001 | Mansfield et al. ........... 370/394 |
| 6,381,215 | B1 * | 4/2002 | Hamilton et al. ............ 370/236 |
| 6,438,105 | B1 * | 8/2002 | Qarni et al. ................. 370/231 |
| 6,535,482 | B1 * | 3/2003 | Hadi Salim et al. ......... 370/229 |
| 6,560,243 | B1 * | 5/2003 | Mogul ......................... 370/468 |
| 6,622,172 | B1 * | 9/2003 | Tam ............................. 709/232 |
| 6,744,765 | B1 * | 6/2004 | Dearth et al. ............... 370/394 |
| 6,745,360 | B1 * | 6/2004 | Srinivas et al. .............. 714/748 |
| 6,745,361 | B1 * | 6/2004 | Gradischnig ................ 714/749 |
| 6,771,659 | B1 * | 8/2004 | Parantainen et al. ........ 370/466 |
| 6,928,304 | B2 | 8/2005 | Wigell et al. |
| 6,961,309 | B2 * | 11/2005 | Carlson et al. .............. 370/235 |

(Continued)

FOREIGN PATENT DOCUMENTS

EP 1143672 A2 * 10/2001

OTHER PUBLICATIONS

Network Working Group, Request for Comments: 2326, Schulzrinne et al., Apr. 1998.*

(Continued)

*Primary Examiner*—Yasin M Barqadle
(74) *Attorney, Agent, or Firm*—Hickman Palermo Truong & Becker LLP

(57) ABSTRACT

Techniques for providing reliable transport of data across a network between a server on a server device and a client on a client device include a process on the client device which determines a number of packets to be sent by the server device without an acknowledgement message from the client device. The number of packets is based on considerations of network problems. A data packet sent to a server device includes a first field holding data indicating the number of packets to be sent by the server device without an acknowledgement message from the client device. Accordingly, a transport layer process on a client device to download large amounts of content from a stateless transport layer process on a server device, substantially reducing the computational resources consumed by the server device in serving thousands of clients.

35 Claims, 6 Drawing Sheets

U.S. PATENT DOCUMENTS

| | | | | |
|---|---|---|---|---|
| 7,000,024 | B1 * | 2/2006 | Champagne et al. | 709/232 |
| 7,013,346 | B1 * | 3/2006 | Tucker | 709/236 |
| 2001/0043564 | A1 * | 11/2001 | Bloch et al. | 370/230 |
| 2002/0007455 | A1 * | 1/2002 | Wiederin et al. | 713/162 |
| 2002/0143980 | A1 * | 10/2002 | Wetherall et al. | 709/232 |
| 2002/0159396 | A1 * | 10/2002 | Carlson et al. | 370/252 |
| 2002/0181494 | A1 * | 12/2002 | Rhee | 370/465 |
| 2003/0043744 | A1 * | 3/2003 | Lu et al. | 370/236 |
| 2003/0074465 | A1 * | 4/2003 | Tang et al. | 709/237 |
| 2003/0095535 | A1 * | 5/2003 | Le et al. | 370/349 |
| 2003/0149786 | A1 * | 8/2003 | Duffy et al. | 709/235 |
| 2004/0003106 | A1 * | 1/2004 | Cunningham et al. | 709/234 |
| 2004/0184430 | A1 * | 9/2004 | Jones et al. | 370/346 |
| 2005/0021832 | A1 * | 1/2005 | Bennett et al. | 709/235 |
| 2005/0094667 | A1 * | 5/2005 | Dahlman et al. | 370/473 |
| 2005/0105469 | A1 * | 5/2005 | Hao | 370/235 |

OTHER PUBLICATIONS

File Transfer Protocol, Request for Comments: 959, Postel et al., Oct. 1985.*

Transmission Control Protocol, Request for Comments: 793, Information Sciences Institute, Sep. 1981.*

Google search for "define:determine".*

J. Postel, "Transmission Control Protocol," IETF RFC 793, Sep. 1981.

W. Stevens, "TCP Slow Start, Congestion Avoidance, Fast Retransmit, and Fast Recovery Algorithms," IETF RFC 2001, Jan. 1997.

* cited by examiner

METHOD AND APPARATUS FOR CLIENT-SIDE FLOW CONTROL IN A TRANSPORT PROTOCOL

CROSS REFERENCE TO RELATED APPLICATION

This application claims benefit as a Continuation-in-part of application Ser. No. 09/901,523, filed Jul. 9, 2001, by J.-P. Champagne and J. Aviani, the entire contents of which is hereby incorporated by reference for all purposes as if fully set forth herein, under 35U.S.C. §120.

FIELD OF THE INVENTION

The present invention generally relates to network transport protocols providing reliable transfer of all data packets in a communication from a server process to a client process. The invention relates more specifically to a client-side flow control in a transport protocol based on network problems.

BACKGROUND OF THE INVENTION

According to the Open Systems Interconnect (OSI) network model, functions involved in transferring data among devices in a network are distributed among different logical layers. The lowest layer represents physical network device hardware. Above that is a data link layer that places bits onto physical links and retrieves data from the links in data packets. Above that is the network layer, which provides the logical layout of the network used for efficient routing of data packets between devices on the network.

The Internet Protocol (IP) is a common network layer protocol. In IP, each packet comprises a header section and a payload. The header comprises, among other data, a destination network address and a source network address. The payload contains data for use by the next layers up.

Above the network layer is a transport layer, which segments data to be sent between two computers into a series of network layer data packets, and which reassembles the segments at the destination device. Generally, the transport layer is responsible for ensuring that the data is delivered error-free and in the proper sequence. The transport layer is also responsible for flow control, which manages transmissions so that the transmitting device does not send more data than the receiving device can process. A common transport layer protocol used on the Internet is the Transmission Control Protocol (TCP). Under TCP, each data packet that is processed comprises a TCP header and a TCP payload holding one or more data segments used by layers above the transport layer.

Above the transport layer is the session layer, which establishes, manages and terminates a communication session between two communicating processes on different network devices. Above the session layer is the presentation layer, which reformats data as necessary for compression or conversion before the data are used by the next layer up. Above the presentation layer is the application layer, where a program executes that generates or uses the transmitted data. For example, a client process (a "client") is an application layer process that requests data from a server process (a "server"). The server is an application layer process on a different network device that provides a service, including data, in response to the request from the client.

The current implementation of TCP, as defined in Request for Comments (RFC) 793 and RFC 2001 of The Internet Society, places the burden of flow control in response to network problems on the transmitting side. This includes the burden of detecting network congestion and deciding when to retransmit. In general, servers do most of the transmitting, so the TCP process on the server device does most of the flow control determinations. Determining flow control involves storing and maintaining state data describing the data packets already sent, tracking an amount of time taken to receive an acknowledgement from the client that particular data packets have been received, and scheduling checks to see if no acknowledgement has been received within a time-to-live value that is specified for each packet.

A disadvantage of the current implementation of TCP becomes apparent when a single server device attempts to transmit data to thousands of clients. In such a case, the computational load on the server device to determine flow control for TCP becomes a limiting factor in server performance. For example, the amount of power consumed by the particular equipment suite used by the server increases substantially with the number of clients; and ultimately the number of clients that the particular equipment suite can serve may be limited. As more clients request services, expensive new equipment may have to be purchased and installed to meet the client demands.

One approach is to relieve the TCP process on the server side from maintaining state information about prior data packets send to a particular client. This "stateless TCP transmitter" approach saves memory consumed to store the state information for thousands of clients. A stateless TCP transmitter approach is described in co-pending U.S. application Ser. No. 09/901,523, filed Jul. 9, 2001, by J.-P. Champagne and J. Aviani.

However, this approach does not handle requests that prompt a server to provide multiple data packets in response. The stateless TCP transmitter is not able to process acknowledgements or determine when a particular data packet should be retransmitted, because the stateless TCP process does not record the time and contents of data packets already sent.

Another approach is to use a stateless transport process on the server, but to require the transport process on the client to continuously acknowledge receipt of each data packet. The server then stores only the last data packet, but no prior data packets, and resends the last data packet if an acknowledgement is not received within the retransmit time. A disadvantage of this approach is the excessive network traffic generated by acknowledging each data packet and the resulting slow transfer for connections with large round-trip time (RTT) characteristics. This approach is similar to that used in Trivial File Transfer Protocol (TFTP).

Based on the foregoing, there is a clear need for a transport layer protocol that does not place most of the burden for flow control on the server device and that handles responses involving multiple data packets.

In addition, there is a need for a transport layer protocol that works with a stateless server side transport layer transmitter.

The past approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent from the following description, are achieved in the present invention, which comprises, in one aspect, a method for providing reliable transport of data across a network between a server on a server device and a client on a client device requesting multiple packets of content from the server. A process on the client device determines a number of packets to be sent by the server device without an acknowledgement message from the client device based on considerations of network problems. A data packet is sent to the server device. The data packet includes a first field holding data indicating the number of packets to be sent by the server device without an acknowledgement message from the client device.

According to an embodiment of this aspect, the server device does not maintain state information about prior data packets exchanged with the client device. The method also includes receiving from the server device a second data packet with a second field holding data indicating a source identification for the content on the server. The second field holding data indicating the source identification for the content on the server is included in the first data packet sent to the server device.

According to another embodiment in which the server device does not maintain state information about prior data packets, the method also includes receiving from the server device a third data packet with a third field holding data indicating a connection identification. The connection identification is used by the server device to validate messages received from the client device. The first data packet also includes the third field holding data indicating the connection identification.

In another aspect of the invention, a method for providing reliable transport of data includes receiving at a process on the server device a request data packet including a first field holding data indicating a number of packets to be sent by the server device without an acknowledgement message from the client device. The number of packets is based on considerations of network problems. The process sends one or more response data packets up to the number of data packets indicated in the first field without waiting for an acknowledgement message from the client device.

In other aspects, the invention encompasses a computer apparatus, and a computer readable medium configured to carry out the foregoing steps.

The techniques of the present invention allow a transport layer process on a client device to download large amounts of content from a stateless transport layer process on a server device, substantially reducing the computational resources consumed by the server device in serving thousands of clients.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
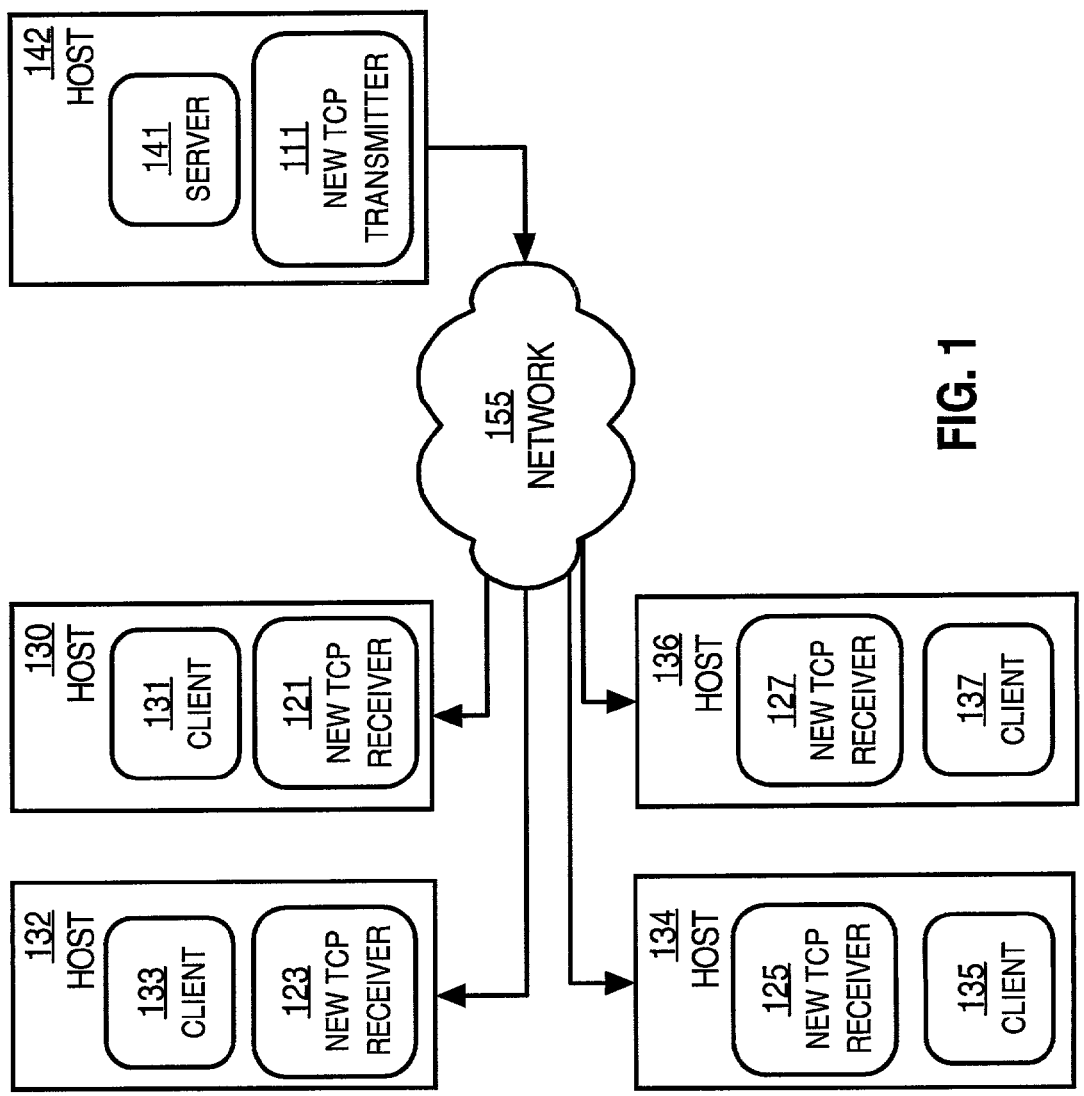
FIG. 1 is a block diagram that illustrates a network using a transport layer process according to an embodiment.

A method and apparatus are described for providing reliable transport of data across a network between a server on a server device and a client on a client device requesting multiple packets of content from the server. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described according to the following outline.
    Operational Context
    Structural Overview
    Functional Overview
    Transmitter Maintains State Information
    Stateless Transmitter
    Method for Transport Layer Receiver on Client Host
    Example with No Lost Packets
    Example with One Lost Packet
    Method for Transport Layer Transmitter on Server Host
    Hardware Overview
    Extensions and Alternatives
    Operational Context To illustrate the use of client side flow control of transport layer processes, the embodiments described herein apply to a stateless transport layer process on the transmitting side. The stateless transport layer transmitter is described in the patent application referenced above and incorporated in its entirely above. However, the invention is not limited to this embodiment, and may be used in embodiments in which the transport layer process on the transmitting side retains some or all state data describing previous data packets sent to a transport layer process on the client device.

In addition, the invention is described as modifications to TCP, herein termed the Client-side Transmission Control Protocol (CTCP). However, the invention is not limited to use with TCP. TCP can only be changed by creating and obtaining formal approval from the Internet Engineering Task Force of a request for comment published on the Internet. CTCP may therefore be implemented as a proposed change to TCP, in some embodiments or may be implemented as a special purpose transport layer process for use only in private networks, in other embodiments.

In addition, embodiments may be implemented as a proposed change to other transport layer protocols that do not currently offer client-side flow control based on network considerations. For example, client-side flow control according to embodiments of the invention can be added to the Trivial File Transfer Protocol (TFTP), which runs on top of the User Datagram Protocol (UDP). UDP is a transport layer protocol used with IP. Like TCP, UDP identifies which process on a device is to receive a data packet using a port field. However, unlike TCP, UDP does not provide reliable delivery or flow control. This alternative has the consequence of making TFTP more complex and therefore possibly less desirable for use with devices having limited memory.

As other examples, client-side flow control according to the approaches herein can be added to the Transport Protocol Class 4 (TP4) of the Open System Interconnection (OSI) suite of protocols, to the Sequenced Packet Protocol (SPP) of the Xerox™ Network System (XNS), to the Sequenced Packet Exchange (SPX) of the Novell™ protocol stack, to the Apple-Talk Data Stream Protocol (ADSP) of the AppleTalk™ protocol stack of Apple Computer Inc., to the Network Basic Input/Output System (NetBIOS) Extended User Interface (NetBEUI) of the NetBIOS protocols of Microsoft Corporation and IBM Corporation, and to a transport layer protocol of the Digital Equipment Corporation networking protocols (DECNET). The Blocks Extensible Exchange Protocol (BEEP) is a session protocol that runs on top of TCP/IP, which could run on top of CTCP. Approaches described herein also may be used with Express Transport Protocol (XTP) or Stream Control Transmission Protocol (SCTP), which is defined in RFC 2960.

In addition, the illustrated embodiments are described in the client-server context, but the approaches herein may be applied to application programs that act as both client and server or applications that act as peers in two-way communications in other embodiments.

Structural Overview

FIG. 1 is a block diagram that illustrates a network using a transport layer process according to an embodiment. One or more hosts 130, 132, 134, 136, 142 are computing devices that are communicatively coupled to network 155. Network 155 may comprise one or more local networks, wide area networks, internetworks, or a combination thereof. The network 155 may be the Internet, or a private network.

A server 141 executes on host 142 and provides a service in response to a request from one or more clients. A new TCP transmitter 111 also executing on host 142 performs transport layer transmission processes. According to the illustrated embodiment, the new TCP transmitter 111 is a stateless transport layer transmitter. TCP transmitter 111 and TCP receivers 121, 123, 125, 127 are termed "new," herein, to indicate that they use the client-side flow control approaches that are described herein.

Any number of hosts executing clients that request the services from server 141 may be communicatively coupled to network 155. The multiple hosts are represented by the four hosts 130, 132, 134, 136 in FIG. 1. On each host, a client 131, 133, 135, 137, respectively, executes. The new TCP receivers 121, 123, 125, 127, respectively, are also executing on the hosts to perform transport layer receiver processes.

For purposes of illustrating a simple example, FIG. 1 depicts only four clients; however, other embodiments include many thousands of clients. For example, in an embodiment with mobile wireless devices as clients, such as mobile telephones or hand held devices, there may be thousands of clients requesting service from a particular land station as the server. In this embodiment, the network 155 is a wireless link, and the host 142 is connected to another network, not shown, such as the Internet. By transferring flow control burdens to the mobile wireless device, less expensive equipment may be employed at the land station to service the same thousands of clients. The extra burden on the client-side may be small enough to be accommodated by the small mobile device since each client is likely to be communicating with only one server.

Figure 2A:
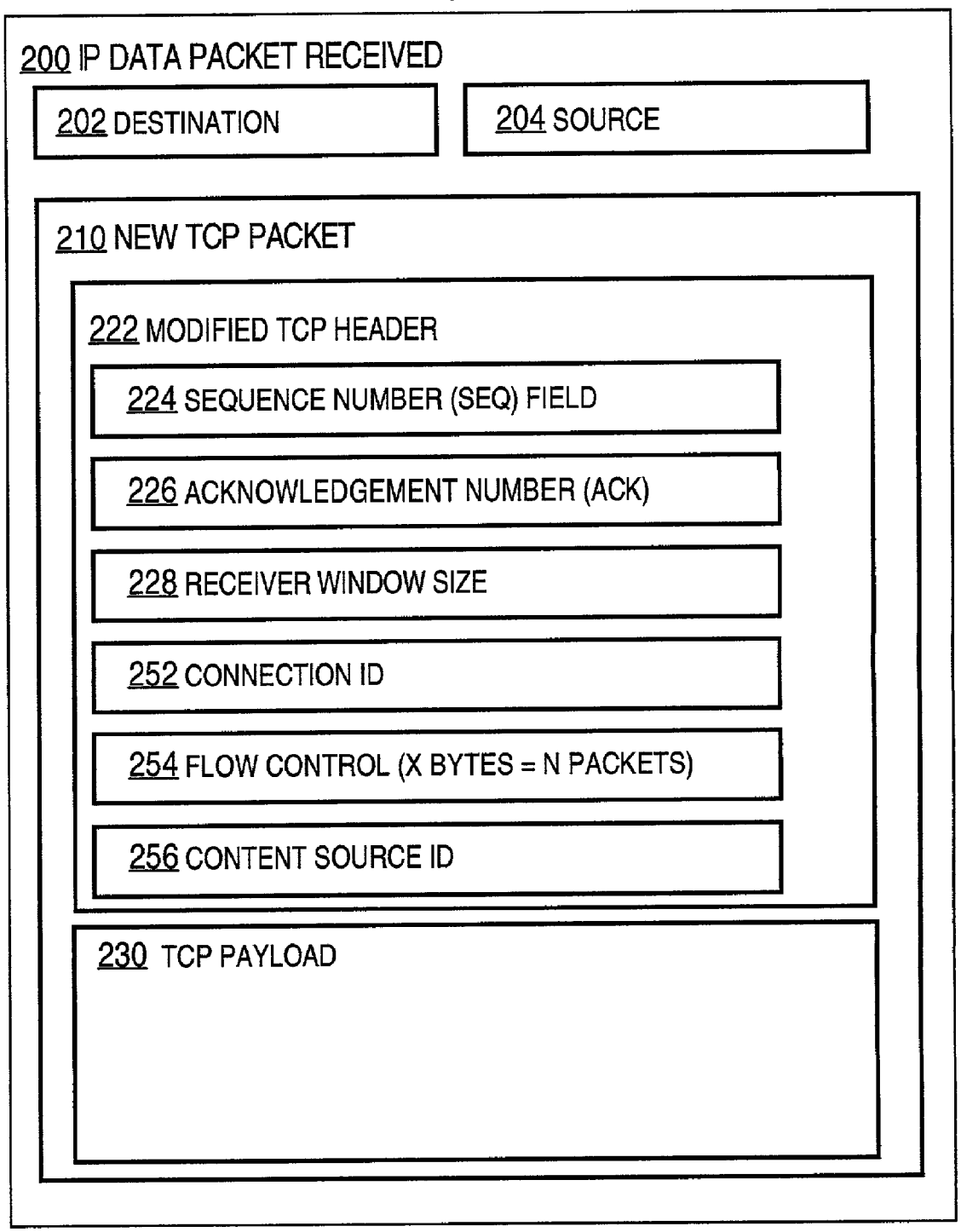
FIG. 2A is a simplified block diagram illustrating selected fields in a data packet according to an embodiment.

FIG. 2A is a simplified block diagram illustrating selected fields in an IP data packet 200, according to an embodiment. TCP receivers 121, 123, 125, 127 communicate with the TCP transmitter 111 in both directions using data packets that generally conform to TCP standards but have modified transport layer headers. The IP data packet 200 includes an IP header with a destination field 202 holding data indicating the logical network address of the recipient of the data packet, and a source field 204 holding data indicating the logical address of the sender of the data packet. The header may comprise other standard fields, which are omitted from FIG. 2A for purposes of clarity, such as checksum, version, time-to-live (TTL), etc. In the payload of the IP packet is a new TCP packet 210 that includes a modified TCP header 222 and a TCP payload 230. The TCP payload 230 includes a request message from a client in a data packet sent from the client device to the server device, or a response message from the server in a data packet sent from the server device to the client device.

The standard TCP header includes an SEQ field 224 holding data indicating an integer sequence number (SEQ) and an ACK field 226 holding data indicating an acknowledgement number that is related to the sequence number of TCP packets already received. The standard TCP header also includes a window field 228 holding data indicating the space available in a buffer on the client side for storing TCP payload data received from the server side. Other fields included in the standard TCP header are not shown.

According to one embodiment, the modified TCP header further comprises a connection identification ("connection ID") field 252, a flow control field 254, and a content source identification ("source ID") field 256. The connection ID field 252 and source ID field 256 are used with a stateless TCP transmitter, and can be omitted in embodiments in which the transport layer transmitter retains state information. An example of a stateless TCP transmitter is described in co-pending U.S. application Ser. No. 09/901,523, filed Jul. 9, 2001, by J.-P. Champagne and J. Aviani.

The connection ID field 252 holds data that allows the stateless transport layer transmitter, such as new TCP transmitter 111, to verify that a data packet did originate from the client device indicated in the source field 204 in order to prevent denial of service ("DoS") attacks on a client, as described in more detail below. The source ID field 256 holds data uniquely identifying the source of the content on the server that is being transmitted to the client. The data in the source ID field 256 reminds the stateless transport layer transmitter, such as new TCP transmitter 111, of what content is being transmitted to the client over several data packets, as described below.

The flow control field 254 holds data that indicates the number of bytes to send to the client in one or more data packets without waiting for a TCP message acknowledging receipt of the one or more data packets. The data in the flow control field 254 is determined by the client based on considerations of network problems, as described below. In some embodiments, the flow control field contains the number of data packets to send, rather than the number of bytes. A flow control field that holds data indicating the number of data packets can contain fewer bits than a flow control field that expresses the number of bytes.

In one embodiment, the connection ID field 252 is a 64-bit field positioned immediately after the ACK field 226 of the standard TCP header; the flow control field 254 is a 32-bit field positioned immediately after the connection ID field; and the source ID field 256 is a 32-bit field positioned immediately after the flow control field. The remaining fields of the standard TCP header follow the source ID field in the same size and order as in the standard TCP header.

Functional Overview

Figure 2B:
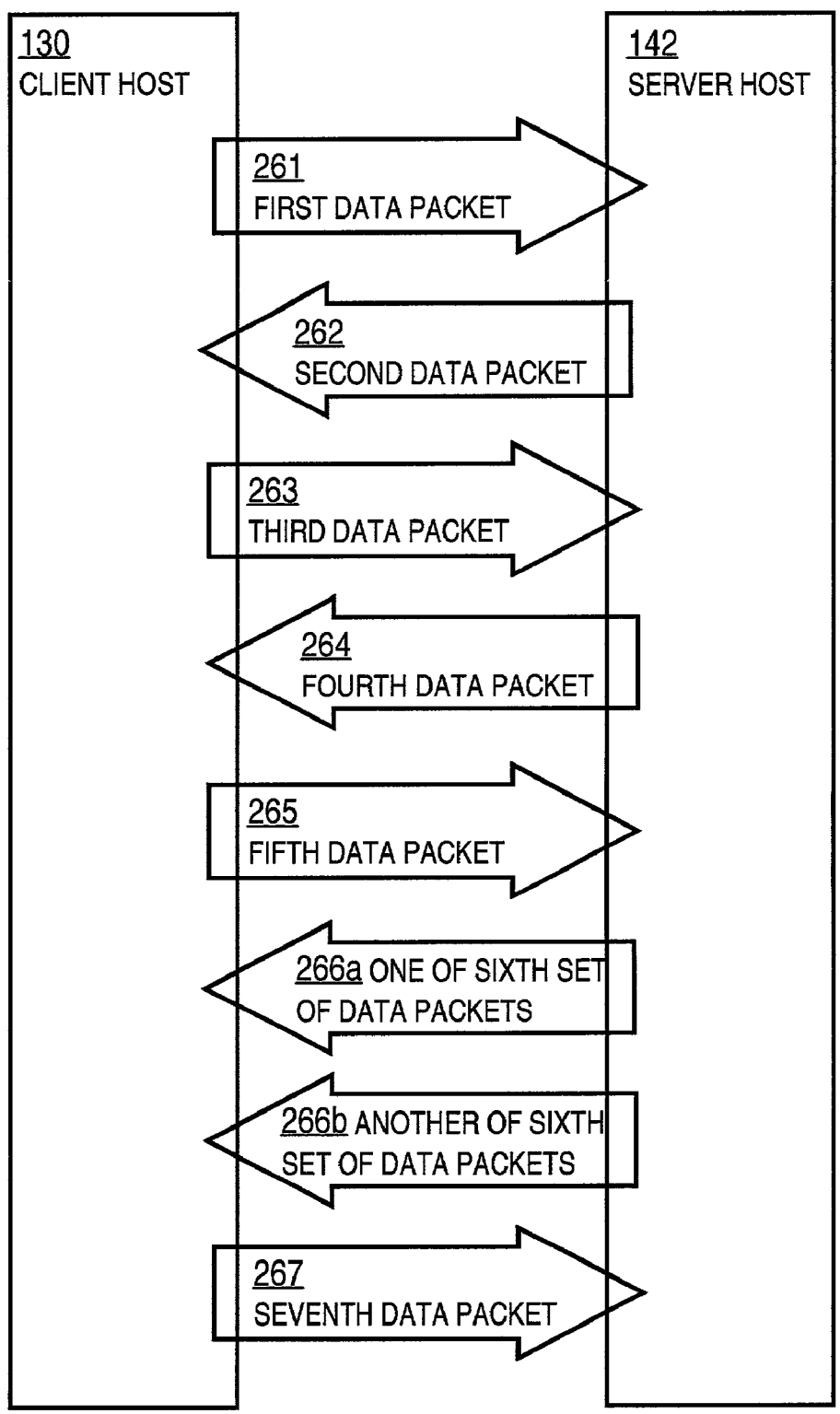
FIG. 2B is a block diagram illustrating a sequence of data packets exchanged between client and server, according to an embodiment.

FIG. 2B is a block diagram illustrating a sequence of data packets 261, 262, 263, 264, 265, 266a, 266b, 267 exchanged between client host 130 and server host 142, according to an embodiment.

The first three data packets 261, 262, 263 exchanged between the client host 130 and the server host 142 perform a three-part handshake process as defined in conventional TCP. The handshake process synchronizes both sides of a connection by allowing the sides to agree upon initial sequence numbers. Each side chooses a sequence number used to track bytes within the stream being transmitted. The client-side TCP receiver chooses an initial sequence number "SEQ_C1" and the server side TCP transmitter chooses and initial sequence number "SEQ_S1."

In this description, the term "client side" refers to one or more devices that are in the logical position of client host 130, and the term "server side" refers to one or more devices acting in the logical position of server host 142.

Transmitter Maintains State Information

For a transmitter that retains state information, like a conventional TCP transmitter, the server side keeps track of the client sequence number and server sequence number of each connection. The server can track many simultaneous connections with many clients using a connection table.

According to conventional TCP, a data packet A is received with a value of SEQ_A in the SEQ field 224 and a value of ACK_A in the ACK field 226. The data packet B sent in response has in the ACK field the value ACK_B=SEQ_A, indicating the bytes sent in the sequence that the device sending data packet B has received. The data packet B sent in response also has in the SEQ field the value SEQ_B=number of bytes already sent+x, where x is the number of bytes of content sent in the TCP payload of the data packet B. This way, the SEQ field sent by a device indicates the sequence of content bytes sent from the device (or at least the sequence of data packets sent if the sending device is a receiver of content) and the ACK field sent by a device indicates the bytes or messages already received. However, during synchronization (SYN) and end of transmissions (FIN) messages, the value in the ACK sent is increased by one over the value in the SEQ received.

After completing the handshake process, the client side transport layer receiver, such as new TCP receiver 121, signals to the server side a number of bytes, represented by the symbol "X," that the server should return in one or more response data packets without an acknowledgement from the client side. X is determined based on various factors relating to potential network problems. For example, in the third data packet 263, the client identifies the first service to be performed by the server and the new TCP receiver provides a value X3 in the flow control field 254. X3 is chosen to avoid network problems by following the well-known slow start approach.

In the slow start approach, a number of bytes of content first sent is small enough to fit in one TCP payload in one data packet. If that content is delivered in sufficiently short time, the next value of X is increased to involve two or more data packets. In each successive set of content, the value of X increases until signs of congestion occur, or until data packet loss occurs. Any sign of network congestion known in the art may be used. For example, the rate of increase in delivery time with an increase in content size can be tracked; and congestion deduced if the rate increases non-linearly or crosses above a predetermined threshold. The value of X is then reduced or leveled to reduce network congestion. The value of X may also depend on whether an expected packet does not arrive, such as occurs with network errors that can be considered an effect of network congestion.

The number X is different from the amount of the client size buffer (also called the receiving "window size") that is available for receiving content from the server. The available window size is passed in the window field 228 of the conventional TCP header. The value of X is determined on the client side so the server side is free from having to perform the computations to detect congestion. A value of X is provided in each of data packets 263, 265, 267 sent from the client side after the initial data packet 261 requesting a connection. Under some circumstances, the value of X and the windows size may be the same. For example, if bandwidth is very large and there is no congestion or loss, then window size may be the major factor that limits transmission rate. In such a case, the application layered over the TCP client may not be fast enough to receive the content that is stored in the TCP client memory.

The service requested is in a request message in the TCP payload 230 of the third data packet 263. The value of X3 determined according to the slow start approach is in the flow control field 254 of the third data packet 263.

In response to receiving the third data packet 263, the server identifies a resource, such as a file or a web page, that contains the content requested, and stores a name of the file or web page in the connection table along with the number of bytes already sent from that resource.

Stateless Transmitter

For a stateless transport layer transmitter like new TCP transmitter 111, the server side does not maintain a connection table or its equivalent. As a result, the stateless transmitter can service more clients with fewer computational resources on the server host, such as memory and processor units. However, the stateless TCP transmitter does not record either SEQ_C1 or SEQ_S1, and does not record the number of bytes already sent.

Instead, the stateless transmitter relies on the value in the ACK field sent by the client to record the number of bytes already sent. This is accomplished by always choosing an SEQ_S1 equivalent to 0xFFFFFFFF during SYN for all connections and sending that value in the second data packet 262 going back to the client device 130. Then the value in the ACK field 226 in the third data packet, designated "ACK_C3" is always zero, indicating none of the content bytes to be sent has yet been received on the client side. The stateless transmitter 111 computes the new value for the SEQ field by adding the number of bytes sent to the value in the ACK field in the data packet last received from the client device. The new TCP receiver 121 then places the value in the SEQ field into the ACK field of the next message sent to the server side. Thus, the value in the ACK field sent by the client always reflects the number of content bytes already received by the client side.

In an alternative embodiment, more consistent with the forward acknowledgement scheme of TCP, the stateless transport layer transmitter treats the value in the ACK field received from a client device as the next byte to transmit to the client instead of the last byte actually received by the client. In this case, SEQ_S1 may be set to zero. In either case, the stateless server sets the value of the SEQ field as the position in the file of the chunk of data being sent by the server, e.g., 0 for the first byte, etc.

The stateless new TCP transmitter 111 relies on the data packets from the client side to report the latest value of SEQ_C, and simply copies SEQ_C to generate the next value of ACK_S.

The stateless new TCP transmitter 111 also generates a secret number called a connection ID based on applying a one-way hash function to a password, the logical network address of the client host 130 that sends the first data packet 261 (e.g., IP address), and a timestamp value that changes every minute. The password is used for all connections set up by the new TCP transmitter 111 but is unknown to any client. The new TCP transmitter 111 can generate this secret number easily for each data packet received from a client, so the connection ID is not stored as state information.

The connection ID is initially computed based on the client host logical network address that is received in the first data packet 261 and reported to the new TCP receiver process 121 on client host 130 in the second data packet 262. The new TCP receiver 121 uses that connection ID in the next data packet 263, which is sent to the server host 142. The new TCP transmitter 111 can verify that the client sending the data packet is indeed the client on the client host 130, if the connection ID included in the connection ID field 252 agrees with the connection ID recomputed by the transmitter 111, based on the IP address in the source field. This process is described further in a later section.

As described above, in the third data packet 263, the client side identifies the service to be performed by the server and indicates the number of bytes X3 to return in one or more response data packets without an acknowledgement from the client side based on considerations of network problems.

In response to receiving the third data packet 263, the server identifies a resource, such as a file or a web page, which contains the content requested. However, there is no connection table in which to store the name of the resource. Therefore, the stateless new TCP transmitter 111 generates a source ID that uniquely identifies that resource, or obtains the source ID from a global look-up table that links each resource with a content ID value.

The source ID is sent to the client side in the source ID field 256 of the fourth data packet 264 along with some of the content in the TCP payload 230 of the fourth data packet 264. The number of bytes sent in the payload is added to ACK_C3, the value of the ACK field 226 in the third data packet, received from the client side, to generate the value SEQ_S4 in the SEQ field 224 in the fourth data packet being sent from the server side. A stateless TCP transmitter such as new TCP transmitter 111 does not record the source ID in a connection table after sending, in the third data packet 263 from the client side, the X bytes requested. Therefore, each data packet 265, 267 from the client side subsequent to the fourth data packet 264 reports the value of the source ID in the source ID field 256.

As shown in FIG. 2B, after receiving the first X3 bytes of content in the fourth data packet 264, the client side issues a request for the next X5 bytes of content in a fifth data packet 265. The fifth data packet includes a value of ACK_C5=SEQ_S4 in the ACK field 226 to indicate the bytes sent in the fourth data packet were received and the next byte is expected. The fifth data packet includes a value for the source ID in the source ID field 256 and the value of X5 in the flow control field 254. X5 is larger than X3, in accordance with the slow start approach, and involves the TCP payload of two data packets. The position of the last byte received, in the source specified by the source ID, is indicated by value ACK_C5 in the ACK field 226 of the modified TCP header 222.

In response, the server side sends two data packets 266a, 266b in a sixth set of data packets that carry the next X5 bytes from the source, starting after the byte position specified by ACK_C5 in the ACK field 226 of the fifth data packet 265. As each data packet of the sixth set is prepared, the server side increments the value in the SEQ field by the number of bytes sent in that data packet and reports the new values, SEQ_S6a or SEQ_S6b, in the SEQ field 224.

As shown in FIG. 2B, after receiving the next X5 bytes of content in the sixth set of data packets 266a, 266b, the client side issues a request for the next X7 bytes of content in a seventh data packet 267. The seventh data packet includes a value of ACK_C7 SEQ_S6b in the ACK field 226 of the seventh data packet 267 to indicate both data packets of the sixth set were received. The seventh data packet includes a value for the source ID in the source ID field 256 and the value X7 in the flow control field 254. X7 is larger than X5, in accordance with the slow start approach, and involves the TCP payload of three or more data packets.

In response, the server side sends an eighth set of data packets, not shown. The process continues until all the content of the source has been transferred to the client side.

If a data packet expected on the client side is not received within a certain time called herein a "retransmit time," the client side issues a next data packet that requests the missing content again. The missing content is identified by the source ID and the position within the source of the last byte received before the missing content. The position of the last byte received is reported in the ACK field 226 of the next data packet sent from the client side, based on the SEQ field in the last data packet received before the gap.

For example, if data packet 266a of the sixth set is not received within the retransmit time, the client side issues the seventh data packet 267. The last data packet received before the gap is the fourth data packet 264. The seventh data packet is formed with a value of X7=one TCP payload in the flow control field 254, the value of the source ID in the source ID field 256, and the value of ACK_C7=SEQ_S4 in the ACK field 226 to indicate where content to be sent again starts in the source. After the missing content is received in an eighth data packet, from the server side, the client side issues a ninth data packet, that requests bytes starting after the bytes received in data packet 266b, as indicated by a value in the ACK field 226 of ACK_C9=SEQ_S6b+1.

In this way the client side determines network problems and adjusts flow control based on considerations of network problems, including a slow start approach and when to request a retransmission. This decreases the burden on the server side and allows less expensive equipment on the server side to server more clients.

Method of Transport Layer Receiver on Client Host

Figure 3:
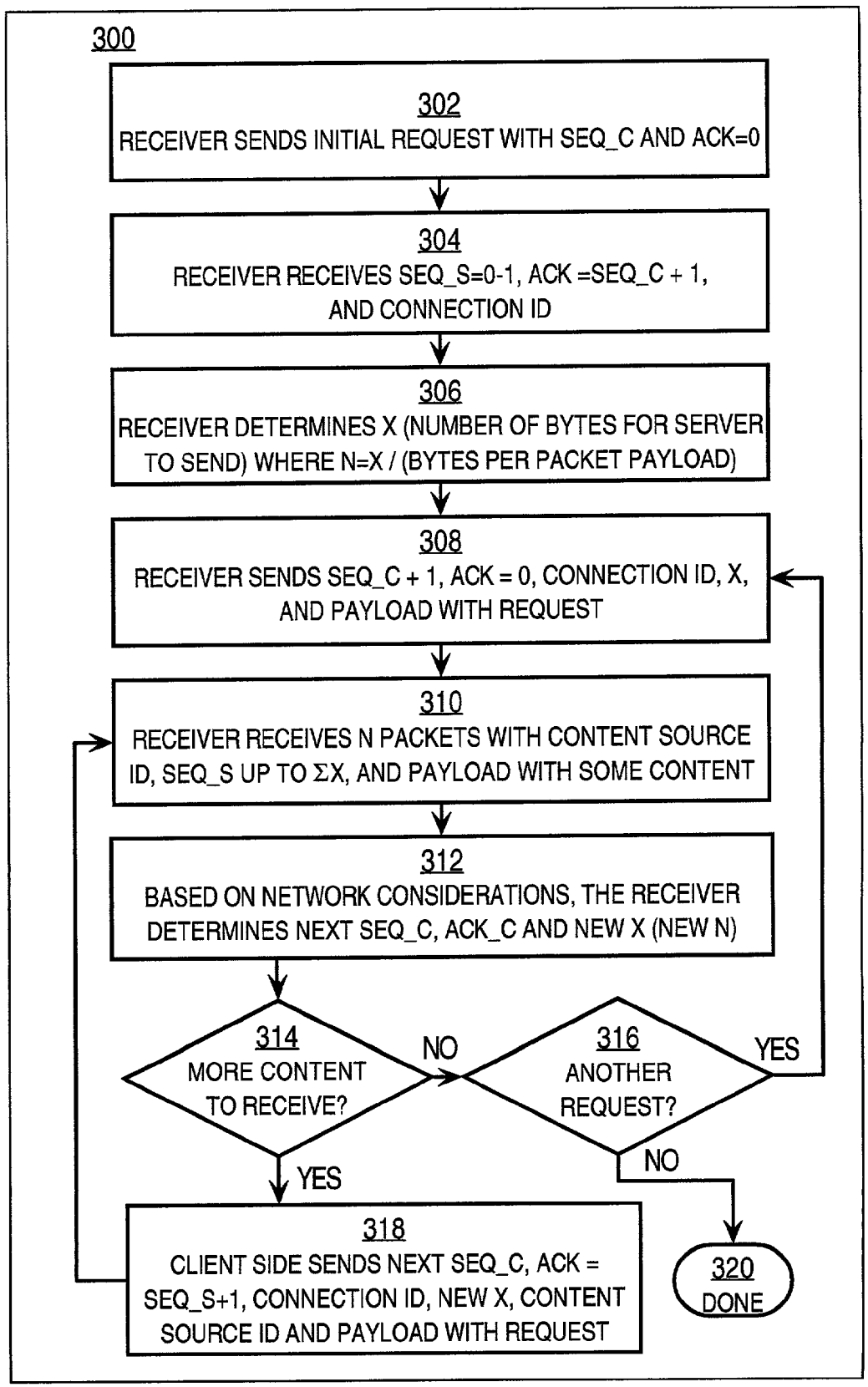
FIG. 3 is a flowchart that illustrates a high level overview of one embodiment of a method executed on a client device for providing reliable transport with a stateless transport layer process on a server device.

FIG. 3 is a flowchart that illustrates a high level overview of one embodiment 300 of a method executed on a client device for providing reliable transport with a stateless transport layer process on a server device. For example, the steps of embodiment 300 are performed by the new TCP receiver process 121 on client device 130 for client 131 to obtain multiple data packets of content from a stateless new TCP transmitter process 111 on host 142 for server 141. Although steps are illustrated in FIG. 3 and following flowcharts in a particular order, in other embodiments the steps can be performed in a different order, or overlapping in time.

For purposes of illustration, the description herein assumes that Table 1 lists the values selected and data packets that are sent, for an example with no lost data packets. Also for purposes of illustration, the description herein assumes that Table 2 lists the values selected and data packets that are sent for an example with one lost data packet.

In the first column of Table 1 and Table 2, the data packets are numbered in sequence regardless of the host sending the packet, as illustrated in FIG. 2B. The host sending the packet is denoted after the comma in the first column by the symbol "C" for client host 130 or the symbol "S" for server host 142.

Each row in Table 1 and Table 2 is discussed below as the formation of the corresponding packet is discussed in reference to the methods of FIG. 3 and FIG. 4. In the current section, the method of FIG. 3, executed on the client side, is described. In the next section, the method of FIG. 4, executed on the server side, is described.

set to "1" to indicate this is an initial request for a connection. The connection ID field 252, flow control field 254, and source ID field 256 are left empty (all zeroes). The values just described are listed in Table 1 for data packet 1,C. The new TCP receiver 121 sends the new TCP packet 210 to other processes on the host 130 which add values for the destination and source fields and place this first data packet onto the network 155, thus sending the first data packet 261 to server

TABLE 1

Example values in key header fields of data packets exchanged - no lost packets

| Data packet number, sender | SEQ field | ACK field | Connection ID field | Flow Control field | Source ID field | Number of bytes in Payload |
|---|---|---|---|---|---|---|
| 1, C | SEQ_C1 = 1111 | ACK_C1 = 0 | 0 | 0 | 0 | N1 = 0 |
| 2, S | SEQ_S2 = 0xffffffff | ACK_S2 = 1112 | 0x1a63fb29 | 0 | 0 | N2 = 0 |
| 3, C | SEQ_C3 = 1112 | ACK_C3 = 0 | 0x1a63fb29 | X3 = 512 | 0 | N3 = 100 |
| 4, S | SEQ_S4 = 0 | ACK_S4 = (1112 + N3*) | 0x1a63fb29 | 0 | 13782 | N4 = 512 |
| 5, C | SEQ_C5 = 1112 + N3 = ACK_S4 = 1212 | ACK_C5 = 512 (This is 0 + N4**) | 0x1a63fb29 | X5 = 2048 | 13782 | N5 = 0 |
| 6a, S | SEQ_S6a = N4 = 512 | ACK_S6a = SEQ_C5 + N5 = SEQ_C5 | 0xcb72a6ae | 0 | 13782 | N6a = 1024 |
| 6b, S | SEQ_S6b = SEQ_S6a + N6A = 1536 | ACK_S6b = ACK_S6a = SEQ_C5 | 0xcb72a6ae | 0 | 13782 | N6b = 1024 |
| 7, C | SEQ_C7 = SEQ_C5 + N5 = SEQ_C5 = 1212 | ACK_C7 = SE_S6b + N6b = 2560 | 0xcb72a6ae | X7 = 4096 | 13782 | N7 = 0 |
| Etc. | | | | | | |

TABLE 2

Example values in key header fields of data packets exchanged - lost packet

| Data packet number, sender | SEQ field | ACK field | Connection ID field | Flow control field | Source ID field |
|---|---|---|---|---|---|
| 1, C | SEQ_C1 = 1111 | ACK_C1 = 0 | 0 | 0 | 0 |
| 2, S | SEQ_S2 = 0xffffffff | ACK_S2 = 1112 | 1A63FB29 | 0 | 0 |
| 3, C | SEQ_C3 = 1312 | ACK_C3 = 0 | 1A63FB29 | X3 = 512 | 0 |
| 4, S | SEQ_S4 = 512 | ACK_S4 = 1312 | 1A63FB29 | 0 | 13782 |
| 5, C | SEQ_C5 = 1312 | ACK_C5 = 512 | 1A63FB29 | X5 = 2048 | 13782 |
| 6a, S | SEQ_S6a = 1536 | ACK_S6a = 1312 | CB72A6AE | 0 | 13782 |
| 6b, S | SEQ_S6b = 2560 | ACK_S6b = 1312 | CB72A6AE | 0 | 13782 |
| 7, C | SEQ_C7 = 1312 | ACK_C7 = 512 | CB72A6AE | X7 = 1024 | 13782 |
| 8, S | SEQ_S8 = 1536 | ACK_S8 = 1312 | CB72A6AE | 0 | 13782 |
| 9, C | SEQ_C9 = 1312 | ACK_C9 = 2560 | CB72A6AE | X9 = 1024 | 13782 |
| 10, S | SEQ_S10 = 3584 | ACK_S10 = 1312 | 904580F1 | 0 | 13782 |

Example with no Lost Packets

In step 302, the client forms an initial request to establish a connection with the server. For example, a user of a web browser clicks on a link to a video service web page. For purposes of illustration, it is assumed that client 131 on host 130 is attempting to establish the connection to server 141. The new TCP receiver 121 selects an initial value for the SEQ on the client side, designated here as "SEQ_C 1," and places this value in the SEQ field 224. For example, as shown in Table 1, SEQ_C1=1111. SEQ will be incremented with the number of bytes sent in each message of a sequence of messages sent from the client side receiver 121.

The new TCP receiver 121 also sets the value of the ACK field 226 to zero. A "SYN" bit in a conventional TCP field is host 142. Step 302 is similar to preparing the first data packet sent according to conventional TCP.

In response, in step 304, the client host 130 receives from the server host 142, a second data packet 262 and passes the second TCP packet 210 contained therein to the new TCP receiver 121. For example, the second data packet contains values for the fields listed in Table 1 in the row representing the data packet "2,S." The new TCP receiver 121, like the conventional TCP receiver, extracts from the SEQ field 224 a value sent by the server and designated herein as "SEQ_S2," and extracts from the ACK field 226 a value ACK_S2 equal to SEQ_C1+1, or "1112," indicating the TCP transmitter is ready to receive the next packet in the sequence of packets being sent from the client as part of the SYN exchange.

According to this embodiment, however, SEQ_S2 has a value represented by all ones, so that incrementing the value yields a value of SEQ_S2+1=0xffffffff. This is represented in FIG. 3 and Table 1 by the notations that "SEQ_S=0-1" and "SEQ_S2=0xffffffff," respectively. In addition, the connection ID field 252 of the second data packet holds a value provided by the new TCP transmitter 111 that the new transmitter 111 can use to verify that future messages purported to be from client 131 are indeed from client 131. For example, as listed in Table 1, a four-byte (32-bit) random number having the hexadecimal value 0x1a63fb29 is included in the Connection ID field. The steps to form the value in the connection ID field at the server side are described in more detail in the next section with reference to FIG. 4. In step 304, the new TCP receiver 121 extracts the value of the connection ID from the connection ID field 252 of the second data packet. Since this is part of the handshake to establish the connection, there is no message from the server 141 in the TCP payload 230 of the second data packet 262 to be passed to the client 131.

In step 306, unlike the conventional TCP receiver, the new TCP receiver 121 determines, based on network considerations, how many bytes of the requested content to be sent by the new TCP transmitter 111 without feedback from the TCP receiver. In the conventional TCP, the TCP transmitter makes this determination. However, according to these embodiments, the new TCP receiver 121 takes on the computational load of determining X. Any method known in the art can be used to determine X, the number of bytes to send.

For example, in step 306 it is determined to employ a slow start transfer in which the number of bytes to send initially is small enough to be included in the TCP payload of one data packet. The maximum amount of data that can be held in the payload of one data packet depends on the maximum transmit units (MTU) for the transport layer of a particular network. In some embodiments X is set equal to MTU, in other embodiments X is set less than MTU for a slow start. For example, as shown in Table 1, X3 is set to 512 bytes.

In Table 1, values in the "Number of bytes in Payload" column are given in values that are labeled the form Nx, which refers to the number of bytes in the payload of packet "x,C" or "x,S" that should be sent by the new TCP transmitter 111, designated herein by the symbol "N." For purposes of illustration, assume that if X3 is 512 bytes, then N3=100. Similarly, N4 indicates the number of bytes in the payload for packet "4,S". This value is 512. In contrast, N5=0 since it is strictly an acknowledgment with a new request in this particular example, as described further below.

In step 308, the new TCP receiver 121 generates a third new TCP packet 210 packet of a third IP data packet 263 represented in Table 1 by "3,C." The new TCP receiver 121 places the request for a particular service in the third TCP payload; for example, a request for the Web page is placed in the third TCP payload 230 of the third data packet 263. It is assumed, for purposes of illustration, that the request for the web page involves 100 bytes of content in the TCP payload; therefore, ISN_C is incremented by 100.

In addition, in step 308, the new TCP receiver 121, like the conventional TCP receiver, determines a value for the ACK field 226 of the third data packet by incrementing the value SEQ_S2 received from the server in the SEQ field 224 of the second data packet 262 (such that ACK_C3=0, in the example of Table 1), and determines a value SEQ_C3 for the SEQ field 224 of the third data packet by incrementing the value of ACK_S2 by the number of bytes sent in the payload from the client. For example, since packet "2,S" had a payload of N2=0 bytes, then SEQ_C3=1112+0=1112.

In step 308, unlike the conventional TCP receiver, the new TCP receiver 121 also places the value "0x1a63fb29" of the connection ID into the connection ID field 252 of the third data packet 263. The stateless TCP transmitter 111 uses the value in the connection ID field 252 to determine that the third data packet 263 actually originates from the same client 131 as the first data packet 261 originated from, as described in more detail in the next section.

In step 308, also unlike the conventional TCP receiver process, the new TCP receiver 121 places the value of X3, determined in step 306, into the flow control field 254 of the third data packet 263. For example, as shown in Table 1, X3=512. The TCP transmitter 111 uses the value X3 in the flow control field 254 to determine how many data packets to send with content from the service requested in the TCP payload 230 of the fourth data packet 264.

In addition, in step 308, the third TCP packet 210 is passed to other processes on the host 130 to send the third TCP packet 210 to the server host 142 in the third data packet 263.

Alternatively, the fourth packet is sent also by the client (and could be shown in Table 1 as "4,C"), with the request for the particular document in it, and the third packet serves only as an acknowledgment.

In step 310, the new TCP receiver 121 receives up to N data packets from the new TCP transmitter 111 on the server host 142. Fewer packets are received if there are lost packets such as can occur with network problems. In addition, fewer packets are received if the end of the content occurs within the next X bytes. For the illustrated example, only one data packet is received in step 310 at this time, which is the fourth data packet 264, illustrated in Table 1 by the row with "4,S" in the first column.

As does a conventional TCP receiver, the new TCP receiver 121 extracts from the fourth data packet 264 a value SEQ_S4 from the SEQ field 224, and a value ACK_S4 from the ACK field 226, and Y bytes of content from the TCP payload 230. For example, as shown in Table 1, SEQ_S4=0 indicating the next packet to be has a sequence number of 0. The SEQ field grows with each data packet received from the server side and should indicate the sum of all the bytes sent, which is less then or equal to the sum of the Xs. This is indicated in FIG. 3 by the expression that the value in SEQ_S is "up to $\Sigma X$." Also shown in Table 1 is that ACK_S4=(1112+N3), which indicates that the new TCP transmitter 111 is responding to the message with the value 1212.

In step 310, the new TCP receiver 121 also extracts from the fourth data packet 264 a value of the content source ID in the source ID field 256. The content source ID is used by a stateless new TCP transmitter 111 to uniquely identify a resource or file or cache on the server host 142 where the content is stored that is to be transmitted over the multiple data packets, as explained in more detail below. Though the server 141 determines the source of the content based on the initial request sent in the third IP data packet, and the server 141 passes that source to the new TCP transmitter 111, a stateless TCP transmitter does not retain this information, such as in a connection table, after sending the N data packets.

A file name is often not appropriate for the content source ID because a file name might not fit in the number of bits allowed for the Source ID field 256. It is assumed for purposes of illustration that the source ID field is allotted 32 bits, that content comes from a file on the server host 142, and that some process on the server host 142 maintains a file table. It is further assumed that the file table lists file numbers increasing monotonically from 1, and that the file table associates with each file number in the table a file name. Then the file number fits in a source ID field 256 having 32 bits if the server host 142 maintains fewer than $2^{32}-1$ files, which occurs if the server host 142 maintains fewer than a number of files somewhat over 4.29 billion files. In addition, in another embodiment, the SEQ and ACK values may be 64-bit values rather than 32-bit values, to allow the process to handle larger files; in a 32-bit implementation, file size is limited to $2^{32}-1$.

For example, as shown in Table 1, the new TCP receiver 121 extracts from the fourth data packet a value of "13782" in the source ID field 256. This value indicates that the content being sent from the server side is in the 13,782$^{nd}$ file in the file table maintained on the server side. The value 13782 is easily expressed within the 32 bits allocated for the source ID field 256.

After all N data packets are received, the TCP receiver passes the bytes of content in the N payloads to the client 131. For the example shown in Table 1, the new TCP receiver 121 passes to the client 131 the first 512 bytes of Web page content from source 13782 that reside in the TCP payload of the fourth data packet.

In step 312, based on network considerations, such as the number and timing of packets received, and based on the values stored in the SEQ field 224 of the packets received, the new TCP receiver 121 determines the values for the fields in the modified TCP header 222 for the next new TCP packet 210, herein called the fifth new TCP packet, for the fifth IP data packet 265. In particular, the new TCP receiver 121 determines a new value X5 to place in the flow control field 254, a new value SEQ_C5 for the SEQ field 224, and a new value ACK_C5 for the ACK field 226 of the fifth data packet 265.

Step 312 includes detecting whether network problems such as congestion has occurred. If not, following the slow start approach, the new value X5 is increased over the value X3. For example, as shown in Table 1, X5 is chosen to be 2048 bytes, and the value 2048 is placed into the flow control field 254. If congestion is detected the value of X5 is decreased or kept level with the value of X3. For purposes of illustration, it is assumed that no network problems are detected and that the slow start approach is applied for the example of Table 1.

For example, as shown in Table 1, the new TCP receiver acknowledges receipt of the fourth data packet by setting ACK_C5=SEQ_S4+N4=(0+512)=512. SEQ_C5 is unchanged because no further bytes are transferred in the payload from the receiver. For example, as shown in Table 1, SEQ_C5=1212. This is equivalent to repeating the value ACK_S4 received from the server host 142 in the fourth data packet. The determination of SEQ_C5 and ACK_C5 is consistent with the determinations of those variables according to conventional TCP receivers; in the example of Table 1, SEQ_C5=1112+N3=ACK_S4=1212, and ACK_S5=N4+0=512. However, because of the selection of SEQ_S2 made by the stateless TCP server, the value in the ACK field 226 represents the total number of bytes transferred from the server host 142 to the client host 130. For example, as shown in Table 1, the value "512" in the ACK field of the fifth data packet represents the number of bytes of content received on the client side. The value in this ACK field also represents the offset, in bytes, of the content to send. That is, the server side should send X5 bytes offset by 512 bytes from the beginning of the file having file number 13782.

As stated above, the detection of network problems in step 312 can be performed using any methods known in the art. For example, the new TCP receiver 121 uses a timer to evaluate the temporal rate of incoming packets sent by the server.

If it is determined in step 312 that a data packet was not received within a particular time, called herein a "retransmit time," then the missing content is to be requested again by the receiver 121, unlike the conventional TCP receiver. For example if no data packet is received in step 310 within the retransmit time from the time when the third data packet 263 is sent, then the next data packet after the retransmit time has expired (either the fifth or the seventh data packet) is sent to request the missing data packet. An example determination of SEQ_C, ACK_C and X for re-transmitting a missing packet is presented below with reference to Table 2.

In step 314, it is determined on the client side whether more content is to be received from the same source on the server side. For example, to indicate that end of content has been reached, the FIN bit is set. Alternatively, an application layer or other layer above the TCP layer determines that the last data packet with content has been received. For example, in HTTP 1.1, the server indicates, in the first packet, the size in bytes of the content that is transmitted. In another alternative, a payload of 0 bytes is returned by the server when end-of-file is reached. In yet another alternative, the control field 254 (FIG. 2A) is used by the server to specify how many bytes remain for transmission including the number of bytes in the payload of the packet being transmitted.

If it is determined in step 314 that more content from the same source is expected, control passes to step 318 where the values of SEQ_C5, ACK_C5, X5, connection ID and source ID are placed in the appropriate fields of the fifth data packet and passed to the IP layer to send the fifth data packet over the internet. For example, the values 1212, 512, 2048, 0x1a63fb29 and 13782 are placed in the appropriate fields as shown in Table 1.

If it is determined in step 314 that more content from the same source is not expected, then control passes to step 316 where it is determined whether the client 131 has another request for server 141. If it is determined that the client does not have another request, such as a user clicking a back button on a web browser, the TCP receiver is done, as indicated in FIG. 3 by passing control to step 320 labeled "Done." If is determined that the client 131 has another request, then control passes back to step 308, as described in more detail below. For purposes of illustration, it is assumed that control passes to step 318 and then to step 310.

In response to sending the fifth data packet 265, the server side sends two data packets 266a, 266b in a sixth set of data packets with 1024 bytes of content in the payload of each. In step 310, according to Table 1, the new TCP receiver 121 receives both data packets. The two packets 266a, 266b may be received in either order. The SEQ field in each of the two packets holds a value SEQ_S6a, SEQ_S6b, respectively, that indicates the last byte of the source included in the TCP payload. The TCP payloads from the two data packets are passed to the client in order of increasing SEQ_S values. As shown in Table 1, the values SEQ_S6a and SEQ_S6b are 512 and 1536, respectively, indicating the last byte of source 13782 sent in data packet 266a is 512 (=N4) and the last byte of source 13782 sent in data packet 266b is 1536 (~512+1024 bytes in the payload of packet 266a). The payload of data packet 266a is passed to the client first, then the payload from data packet 266b is passed.

Also shown in Table 1, is a different value for the connection ID in the two data packets of the sixth set from the connection ID used in previous data packets. The new value is generated because the two data packets of the sixth set were sent in a different minute than the earlier data packets 262, 264 sent from the server side. The connection ID is based on a one-way hash function of an input that includes a timestamp to the nearest minute and a password known only on the server-side; therefore the output changes each minute. The output is not predictable unless a party knows all the inputs.

Since only the server side knows the password, only the server side can verify that the new connection ID is valid for this client.

As shown in Table 1, the source ID does not change from the source ID sent in the fourth data packet, since content is still being sent from the same source. As shown in Table 1, both data packets 266a, 266b in the sixth set, use the same value 1212 in the ACK field 226 for ACK_S6a and ACK_S6b, since no response is expected from the client between the two data packets 266a, 266b.

In step 310, the new TCP receiver 121 passes the content to the client 131 in the correct order, as does the conventional TCP receiver. For example, new TCP receiver 121 passes the next 2048 bytes of the Web page to the client 131.

Control then passes to step 312 for the second time. Again, a value of X is computed based on network considerations and the values for the ACK field and the SEQ field are determined. It is assumed for illustration, that no congestion is detected, so that X7 for the seventh data packet 267 is greater than X5. As shone in Table 1, X7=4096. SEQ_C7 and ACK_C7 are computed in the conventional way because there are no lost or delayed packets. The values in the connection ID field and the source ID field are repeated from the sixth set of data packets 266a, 266b. For example, Table 1 shows that SEQ_C7=SEQ_C5+N5=1212=SEQ_C5. Table 1 also shows that ACK_C7=SEQ_S6b+N6b=2560. The connection ID for the seventh data packet 267 equals the value "0xcb72a6ae" from data packet 266b; and the source ID for the seventh data packet 267 remains the same, 13782, from data packet 266b.

Control passes to step 314 for the second time, where it may be determined that there is more content to receive. Control then passes to step 318 to send the seventh data packet 267.

Control passes to step 310 for the third time to receive the next N packets. Processing continues in the foregoing manner until all packets are sent from the server side. When it is determined, at step 314, that there is no more content to receive and control passes to step 316 to determine whether client 131 has another request for server 141. For purposes of illustration, it is assumed that a user of client 131 clicks on a link on the Web page to a particular video file. In step 316, it is determined based on this that the client 131 has another request for server 141. Control then passes back to step 308 to make a new request.

Continuing through the steps of method 300 as described above, the remaining bytes in the requested video file are sent from the server side to the client side. Subsequent requests are also answered, until the client 131 makes no more requests of the server 141 or terminates the connection.

Example with one Lost Packet

Table 2 shows example values in a sequence of data packets following the method of FIG. 3 for the case of a lost data packet. The steps described above through the sixth set of data packets (the rows of Table 1 up to and including the row having "6b,S" in column one) also apply to the case with a lost data packet. Therefore Table 2 is identical to Table 1 through the row having "6b,S" in the first column. In the case of a lost data packet, however, the difference is that the first data packet of the sixth set, 266a, is not received by the new TCP receiver 121.

In step 312, the new TCP receiver 141 determines that one of the data packets expected in response to the fifth data packet is not received within the retransmit time. Any method known in the art can be used to determine this. The new TCP receiver determines that the missing data packet is the one that delivers 1024 bytes from source ID 13782 starting after byte 512, and that the next data packet has been received.

According to the illustrated embodiment, the new TCP receiver requests only the missing data packet, not all the data packets after the gap. The new TCP receiver will use the bytes already received in the second data packet 267b of the sixth set.

To request the missing packet, the new TCP receiver 121, sends in the ACK field 226 of the next message the last byte received before the gap. For example, as shown in Table 2, in the seventh data packet 267 designated "7,C" in the first column, ACK_C7=512, the last byte received before the gap. The new TCP receiver also sends in the flow control field 254 the number of bytes in the gap. For example, as shown in Table 2, in the seventh data packet 267, X7=1024, the number of bytes of content contained in the missing data packet. The values 1312, CB72A6AE, and 13782 for the SEQ field, the connection ID field and the source ID field, respectively, are all as described above for the seventh data packet 267.

Control then passes to step 314, where it is determined that there is more content to receive. Control then passes to step 318 to send the seventh data packet to the server side.

In response to sending the seventh data packet 267, the server side sends an eighth data packet with 1024 bytes of content in the payload. In step 310, according to Table 2, the new TCP receiver 121 receives the eighth data packet "8.S." The SEQ field holds a value SEQ_S8 that indicates the last byte of the source included in the TCP payload. As shown in Table 2, the value SEQ_S8 is 1536, indicating the last byte of source 13782 sent in the eighth data packet is 1536 (=512+1024).

As shown in Table 2, the source ID does not change from the source ID sent in the sixth set of data packets, since content is still being sent from the same source. As shown in Table 2, the eighth data packet uses the value 1312 in the ACK field 226 for ACK_S8, the same as the value SEQ_C7. In step 310, the new TCP receiver 121 passes the content from the payload of the eighth data packet and then the content from the payload of the second data packet 266b of the sixth set to the client 131, so that the content arrives at client 131 in the correct order.

Control then passes to step 312 again. Again, a value of X is computed based on network considerations and the values for the ACK field and the SEQ field are determined. It is assumed for illustration, that network problems are detected based on the lost data packet, so that X9 for the ninth data packet is less than X5. As shown in Table 2, X9=1024, which corresponds to a number of data packets N9=1. SEQ_C9 is computed in the conventional way, but ACK_C9 is chosen to pick up where the sixth set of data packets left off. The values in the connection ID field and the source ID field are repeated from the eighth data packets. For example, Table 2 shows that ACK_C9=SEQ_S6b=2560.

Control passes to step 314 again, where it is determined that there is more content to receive. Control then passes to step 318 to send the ninth data packet to the server side. In response a tenth data packet is received from the server side. For example, as shown in Table 2 in the row having "10,S" in the first column, the tenth data packet arrives with another 1024 bytes of content from source ID 13782. As shown in Table 2, the number of bytes delivered is SEQ_S10=3584. As also shown in Table 2, a new connection ID value "904580F1" is included, indicating another minute has passed at the server side since the sixth set of data packets was sent. Table 2 also shows that the last message the server side received from the client side is number ACK_S10=1312.

As described above, the receiver 121 can determine the one or few data packets missing and just requests the missing data packets to fill the gap. Subsequent data packets that are received are not retransmitted. This offers automatically the advantages of the selective acknowledgement (SACK) of the conventional TCP. According to SACK, the acknowledgment data packet from the receiver indicates the sequence numbers received so that the transmitter can deduce a gap and retransmit only the data packets in the gap.

In the illustrated embodiment, the missing data packet was detected before the seventh data packet, 7,C, was sent. In more practical embodiments, the missing data may not be detected until later, after the seventh and perhaps after a ninth data packet is sent from the client side. In such embodiments, the same corrective action is taken as is described here for the seventh data packet; however, the request for the missing data is sent in a later data packet.

Method of Transport Layer Transmitter on Server Host

Figure 4:
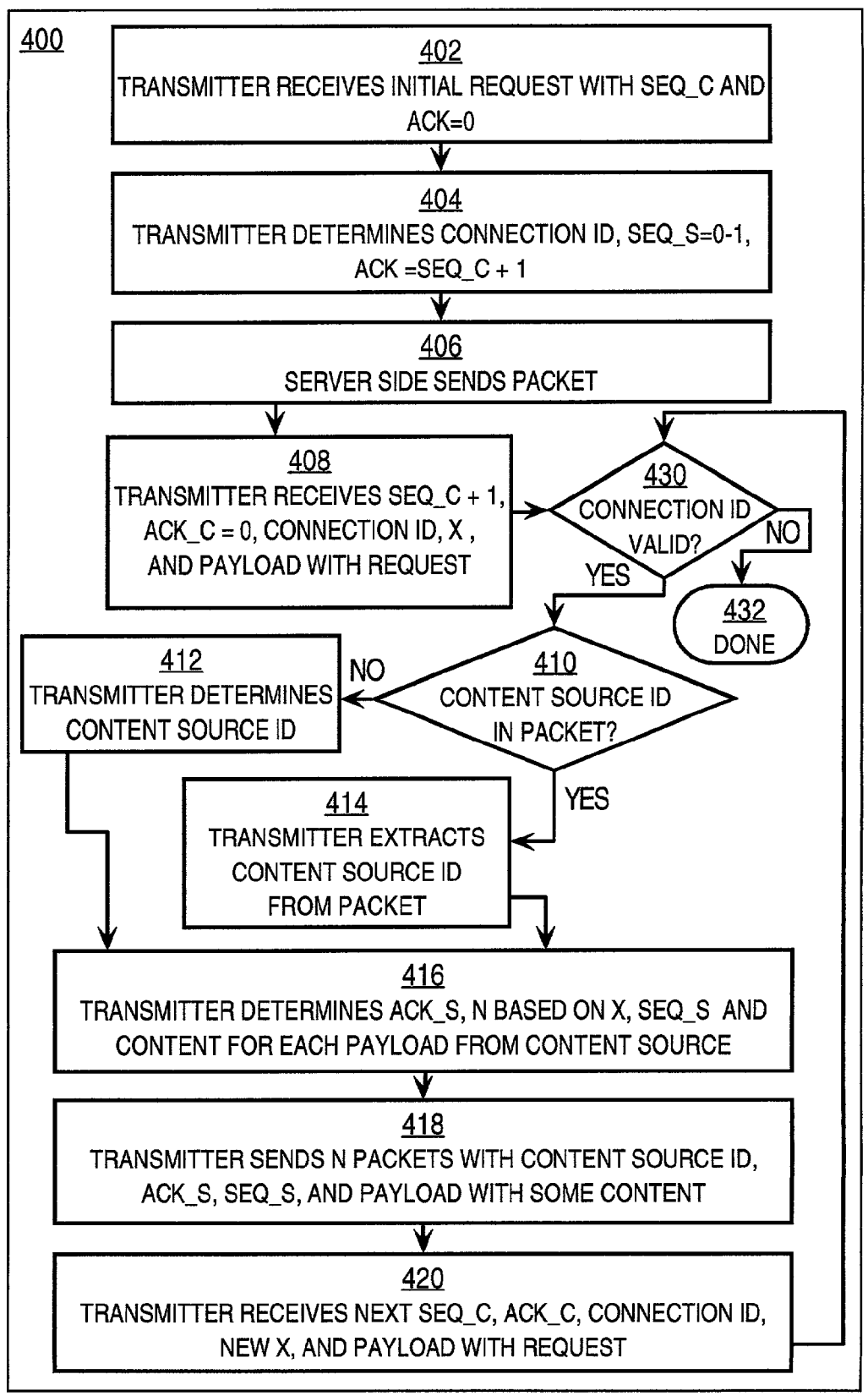
FIG. 4 is a flowchart that illustrates a high level overview of one embodiment of a method executed by a stateless transport layer process on a server device for providing reliable transport with a client device.

FIG. 4 is a flowchart that illustrates a high level overview of embodiment 400 of a method executed by a stateless transport layer process on a server device for providing reliable transport with a client device. The operation of method 400 is illustrated with the example of Table 1. The performance of the method 400 does not depend on network considerations, such as lost data packets or detecting network congestion.

In step 402, the stateless new TCP transmitter 111 on the server side receives the first data packet 261 with an arbitrary SEQ_C1 value in the SEQ field 224 and an arbitrary value ACK_C1 in the ACK field 226. The value ACK_C1 is ignored. For example, as shown in Table 1, the first data packet includes SEQ_C1=1111 and ACK_C1=0. This data packet is recognized as a first step in the three-way handshake to establish a connection by the SYN bit of the conventional TCP header.

In step 404, the transmitter 111 sets the value ACK_S2 for the second data packet by incrementing SEQ_C1 received in the first data packet. For example, as shown in Table 1, ACK_S2=1112. In recognition of the initial request for connection, called synchronization, the transmitter 111 sets the value SEQ_S2 to a value that is incremented to zero. For example, in embodiments in which the ACK field 226 is 32 bits, SEQ_S2 is set to 32 bits of ones (e.g., 0xffffffff in hexadecimal notation well known in the art where each hexadecimal digit represents four bits, and the letter F represents four digits of ones, equivalent to 15 in decimal notation). When 32 bits of ones are incremented by one, the 32-bit result is all zeros.

In addition, in step 404, in response to the synchronization request, the transmitter determines a connection ID. The connection ID is formed to prevent denial of service (DoS) attacks against a client host, such as client host 130, by flooding the client host with many data packets of content from lots of servers even though no client on that host requested any of that content.

In the illustrated embodiment, the connection ID is formed by concatenating a password set by an administrator for the server host 142 with a current timestamp truncated to the minute and with the source IP address of the client host. The concatenated string is then input into a one-way hash function that produces a 64-bit number. The hash function is one way because an attacker who knows the output, the hash function, the source IP address and the timestamp cannot determine the password. A change of one bit of input produces a A completely different output that cannot be predicted given the previous output. Therefore, an attacker who knows the output at one time cannot predict the output at the next minute, when at least one bit of the timestamp changes. For a 64-bit connection ID, an attacker would have to guess one value in $2^{64}$ possible values, a process that is likely to take years by trial and error. For example, as shown in Table 1, the value "0xx1a63fb29" is generated for the connection ID.

Unlike the conventional TCP transmitter, the stateless TCP transmitter does not record SEQ_C1, SEQ_S2, or the source IP address of the client host 130 in a connection table. The stateless TCP transmitter does not even record the connection ID.

In step 406 the server side sends the second data packet 264 to the client side. The new TCP transmitter 111 sends the modified TCP header and the TCP payload to the IP process on the server host 142, which adds the IP header fields and calls the data link process to place the data packet on the physical link to the network.

In step 408, the new TCP transmitter 111 receives the third data packet 263 with the value SEQ_C3=1112, the value ACK_C3=0, the connection ID, the value X3=512, and the TCP payload identifying the resource requested from the server 141. For example, Table 1 shows SEQ_C3=112, ACK_C3=0, connection ID "0x1a63fb29" and X3=512.

In step 430, the stateless TCP transmitter 111 verifies the connection ID, i.e., determines whether the connection ID is valid. If the connection ID is verified, control passes to step 410.

The stateless TCP transmitter 111 has not recorded the connection ID sent in any prior data packet, so a connection table is not referenced during step 430. Instead, during step 430, the stateless TCP transmitter 111 determines a new output from the hash function based on the password, the source IP address of the data packet just received from the client side and the current time, T1. If this new output matches the value in the data packet just received, the connection ID of the data packet just received from the client side is valid. To allow for the possibility that the minute of the current time changed since a prior data packet was sent to the client side from the TCP transmitter 111, if the new output doesn't match the connection ID, the stateless TCP transmitter 111 determines a second output from the hash function based on the password, the source IP address and the time one minute before the time T1. If this second output matches the value in the data packet just received from the client side, the connection ID of the data packet just received from the client side is valid. If not, the connection ID is not valid and the stateless TCP transmitter does not process the data packet further, as represented in FIG. 4 by transferring control to step 432, labeled "Done."

In step 410, the new TCP transmitter determines whether this is an initial request for content to be determined by the server. For example, the new TCP transmitter determines whether the source ID field in the data packet just received is zero. In other embodiments, the transmitter determines whether the value in the ACK field 226 is zero, as it will always be in the third data packet. If this is the initial request for content, then control passes to step 412 to determine the source ID.

In step 412, the transmitter 111 sends the TCP payload on to the server 141 to determine the resource to provide in response to the request in the TCP payload. For example, the server 141 generates a Web page and passes the Web page to the transmitter 111 to transmit back to the client side. In the illustrated embodiment, the transmitter 111 stores the web page in a file on the server host 142. Alternatively, the web page is a static web page already stored on the server host 142, and the server passes to the TCP transmitter the file name of the static web page. As mentioned above, it is assumed for purposes of illustration that some process on the server host 142 maintains a file table. The file table lists file numbers increasing monotonically from 1, and the file table associates with each file number in the table a file name. According to the illustrated embodiment, the stateless TCP transmitter 111 selects as a value for the source ID the file number of the file holding the web page to be transmitted back to the client side. In other embodiments, a cache can be used to store the content, such as the web page, to be transmitted, and a position in cache can be used as the source ID. Control then passes to step 416.

For example, after receiving the initial request in the third data packet 263 with zero in the source ID field and zero in the ACK field, as shown in Table 1, control passes to step 412 during preparation of the fourth data packet 264 in response. In this example, the file number for the Web page is 13782. As shown in Table 1, the file number for the Web page first appears in the source ID of the fourth data packet identified by "4,S" in the first column of Table 1.

If it is determined in step 410 that this is not the initial request to the server for content, but that content already identified by the server is still being sent, control passes to step 414. In step 414 the transmitter extracts the content source ID from the source ID field 256 of the data packet just received. Control then passes to step 416. For example, after receiving the fifth data packet 265 with a non-zero value in the source ID field, as shown in Table 1 by the row with "5,C" in the first column, control passes to step 414 during preparation of the sixth set of data packets 266a, 266b in response to the fifth data packet. The stateless new TCP transmitter 111 extracts the value of the file number 13782 from the source ID field of the fifth data packet. Thus the TCP transmitter 111 can operate as a stateless transmitter that does not save the source ID in a connection table.

In step 416, the stateless TCP transmitter 111 determines ACK_S for the next data packet by repeating the SEQ_C value in the packet just received. For example in response to SEQ_C3=1112, ACK_S4 is set to 1212; and in response to SEQ_C5=1212, ACK_S6a1212.

Also in step 416, the stateless TCP transmitter 111 determines the number N of data packets to send without an acknowledgement from the client side based on MTU and the value of X in the data packet just received from the client side. If the value of X just received is greater than the content remaining to be sent, then fewer than N data packets will be sent. In some embodiments, the transmitter 111 can tell from the file table the number of bytes of content and can compute the actual number of data packets to prepare and send. In the illustrated embodiment, it is determined whether the end of the content is reached as the next data packet is prepared.

For example, after receiving the third data packet 263 identified by "3,C" in the first column of Table 1, with 512 in the flow control field 254, N is determined to be 1. After receiving the fifth data packet 265 identified by "5,C" in the first column of Table 1, with 2048 in the flow control field 254, N is determined to be 2, because MTU is assumed to be 1024 in the illustrated example.

For each of the N data packets to be sent without acknowledgement from the client side, in step 416, the transmitter 111 also determines the number of bytes to place in the TCP payload and places those bytes into the TCP payload. The number of bytes to be placed in one of the data packets is represented by the symbol Yi, where the symbol i represents an integer from 1 to N. The value of i corresponds to one of the N data packets to be sent without acknowledgement from the client side. In some embodiments, as each data packet is finished, it is sent to the IP process to send on to the client side. In the illustrated embodiment, the values of Yi are determined and the payloads for the N or fewer data packets are prepared, and then the data packets are sent to the IP process to send to the client side.

The value of Yi is determined to be the least of X, MTU, the difference between the value of X and the number of bytes sent in the packets through Y(i–1), and the number of bytes left in the content.

In addition, in 416, the value of SEQ_S is also computed based on the value in ACK_C and the values of Yi. For the N data packets to be sent without acknowledgement from the client side, the value of SEQ_S of the ith data packet is the sum of the value in ACK_C and the sum of the number of bytes sent in the packets through Yi.

For example, after receiving the third data packet 263 identified by "3,C" in the first column of Table 1, with 512 in the flow control field 254, N is determined to be 1 and Y1 is 512. SEQ_S4=0, as shown in the SEQ field for the fourth data packet 264 identified by "4,S" in the first column of Table 1.

After receiving the fifth data packet 265 identified by "5,C" in the first column of Table 1, with 2048 in the flow control field 254, N is determined to be 2. Y1 and Y2 are determined to be 1024. SEQ_S6a=N4=512, as shown in the SEQ field for the data packet 266a identified by "6a,S" in the first column of Table 1. SEQ_S6b=SEQ_S6a+N6A=1536, as shown in the SEQ field for the data packet 266b identified by "6b,S" in the first column of Table 1.

After receiving the seventh data packet 267 identified by "7,C" in the first column of Table 1, with 4096 in the flow control field 254, N is determined to be 4. Y1, Y2 are determined to be 1024 and Y3 is determined to be 128. Y3 is 128 because only 128 bytes of content remained in the source ID file. No fourth data packet is prepared.

In step 418 the transmitter includes the values of the source ID and the connection ID into the respective fields of the modified TCP header 222. In some embodiments, the value of the connection ID determined in step 430 is used. In some embodiments, the connection ID is determined based on the timestamp of the time when step 418 is performed. If the time has changed by one minute since the connection ID was formed for the preceding data packet sent to the client side, the connection ID computed will be different. The new TCP packet 210 with the Yi bytes of content in the payload is then sent to the IP process on the server host 142 to send the data packet to the client side.

For example, after receiving the third data packet 263 identified by "3,C" in the first column of Table 1, during preparation of the fourth data packet 264 identified by "4,S" in the first column of Table 1, the connection ID is determined to be the same as when the second data packet 262 identified by "2,S" was prepared. After receiving the fifth data packet 265 identified by "5,C," during preparation of the first of the sixth set of data packet identified by "6a,S" in the first column of Table 1, the connection ID is determined to be different from when the second data packet 262 identified by "2,S" was prepared.

In step 420, the stateless TCP transmitter 111 receives another data packet from the client side that is not a synchronization request, and control passes to step 430 to determine if the connection ID is valid.

Using the steps of FIG. 4, a stateless transport layer transmitter can reliably send all the content from one or more sources on a server host to a client supported by a new transport layer receiver on a different host.

Hardware Overview

Figure 5:
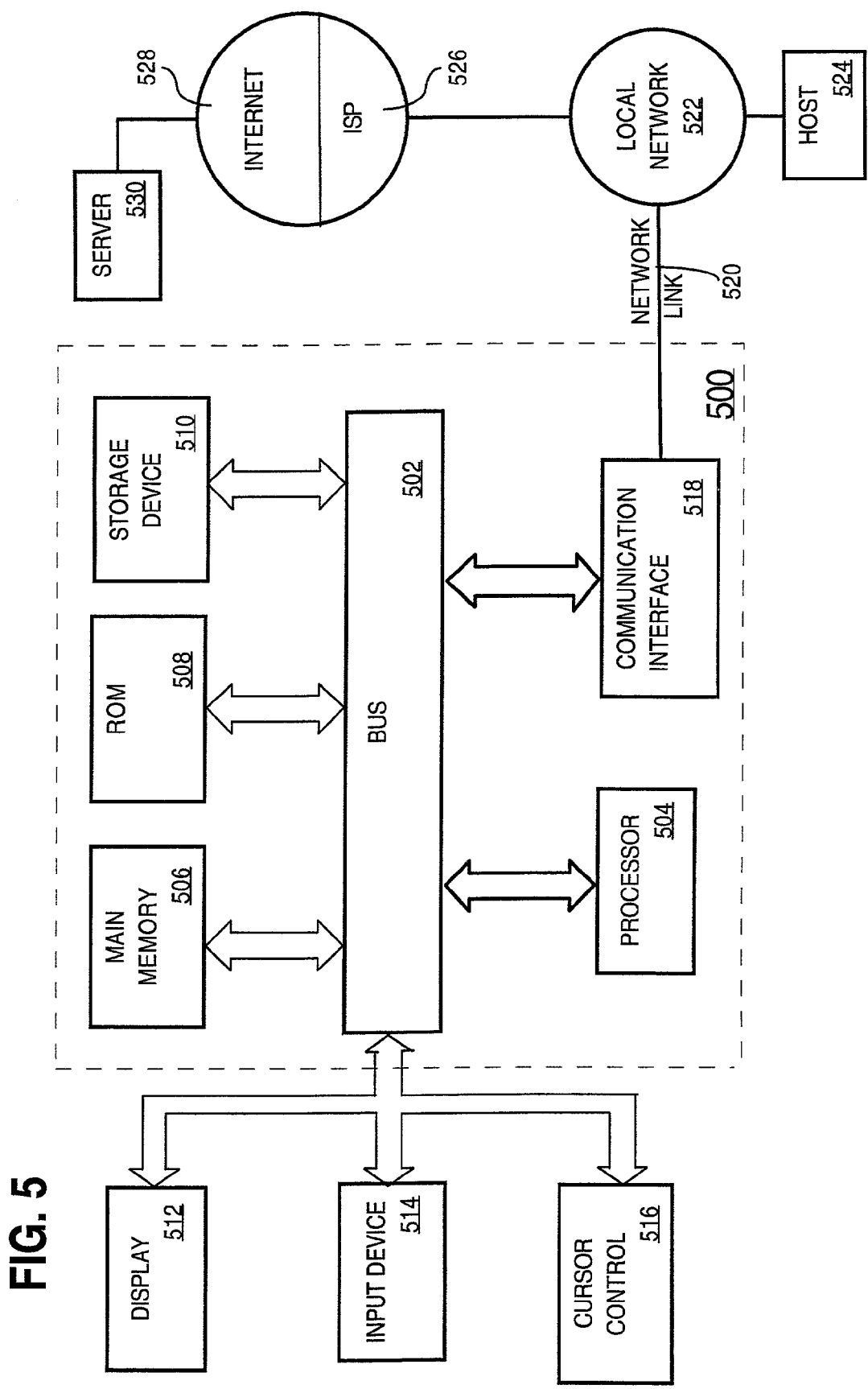
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

Extensions and Alternatives

In the foregoing specification, the invention has been described with reference to specific embodiments thereof. However, it will be evident that various modifications and changes may be made thereto without departing from the broader spirit and scope of the invention. The specification and drawings are, accordingly, to be regarded in an illustrative rather than a restrictive sense.

What is claimed is:

1. A method for providing reliable transport of data across a network between a server on a server device and a client on a client device requesting multiple packets of content from the server, the method comprising the steps of:
   receiving from the server device a connection identification that is a secret number generated by the server device and used by the server device to verify that a plurality of messages received by the server device is indeed from the client device;

detecting, by the client device only, one or more network problems based on prior exchange of data packets between the server device and the client device;

determining at the client device only, based on considerations of the network problems, a number of packets to be sent by the server device without an acknowledgement message from the client device; and sending to the server device a first data packet including a first field holding data indicating the number of packets to be sent by the server device without an acknowledgement message from the client device;

wherein the first data packet is one of the plurality of messages that each carry the connection identification;

wherein the connection identification is carried by each message in the plurality of messages in a separate field from a sequence identifier carried by the each message; and wherein the server device does not perform determining the number of packets to be sent by the server device without an acknowledgement message from the client device.

2. A method as recited in claim 1 wherein:

the server device does not maintain state information about prior data packets exchanged with the client device;

the method further comprises receiving from the server device a second data packet with a second field holding data indicating a source identification for the content on the server; and said step of sending the first data packet further comprises including in the first data packet the second field holding data indicating the source identification for the content on the server.

3. A method as recited in claim 2 wherein:

said step of sending the first data packet further comprises including in the first data packet a third field holding data indicating the connection identification.

4. A method as recited in claim 2, said step of sending the first data packet further comprises including in the first data packet a third field holding data indicating the number of data packets already received by the client device.

5. A method as recited in claim 1, wherein:

the method further comprises the step of receiving one or more data packets from the server device containing some of the content from the server; and said step of determining the number of packets further comprises
determining a measure of time associated with receiving the one or more data packets with content from the server device; and
determining the considerations of network problems based at least in part on the measure of time.

6. A method for providing reliable transport of data across a network between a server on a server device and a client on a client device requesting multiple packets of content from the server, the method comprising the steps of:

sending to the client device a data packet with a connection identification that is a secret number generated by the server device and used by the server device to verify that a plurality of messages received by the server device is indeed from the client device;

receiving at the server device a first request data packet including a first field holding data indicating a number of packets to be sent by the server device without an acknowledgement message from the client device, wherein the number of packets is based on considerations of network problems at the client device;

wherein the one or more network problem is detected, by the client device only, based on prior exchange of data packets between the server device and the client device; and sending one or more response data packets up to the number of data packets indicated in the first field without waiting for an acknowledgement message from the client device;

wherein the first data packet is one of the plurality of messages that each carry the connection identification and wherein the connection identification carried by each message in the plurality of messages is a separate field from a sequence identifier carried by the each message;

wherein only the client device determines the number of packets to be sent by the server device without an acknowledgement message from the client device; and wherein the server device does not perform determining the number of packets to be sent by the server device without an acknowledgement message from the client device.

7. A method as recited in claim 6 wherein:

the server device does not maintain state information about prior data packets exchanged with the client device;

the method further comprises the step of determining whether the first data packet includes in a second field data indicating an initial request for the content from the server; and if it is determined that the second field holds data indicating the initial request then performing the step of determining a source identification for the content from the server; and said step of sending the one or more response data packets further comprises including in each of the one or more response data packets a third field indicating the source identification for the content from the server.

8. A method as recited in claim 7, wherein:

the method further comprises, if it is determined that the second field does not hold data indicating the initial request, then performing the step of extracting from a third field in the first data packet data indicating the source identification for the content from the server; and said step of sending the one or more response data packets further comprises including in each of the one or more response data packets at least some of the content from a source identified by the source identification.

9. A method as recited in claim 8, wherein:

the second field and the third field are the same field; and
said step of determining whether the first data packet includes in the second field data indicating the initial request further comprises determining whether the second field holds data indicating no source identification for the content from the server.

10. A method as recited in claim 6, said step of receiving the first data packet further comprises extracting from the first data packet a third field holding data indicating the number of data packets already received by the client.

11. A method as recited in claim 7 wherein:

the method further comprises determining the connection identification; and said step of sending the one or more response data packets further comprises
including in each of the one or more response data packets a fourth field holding data indicating the connection identification.

12. A volatile or non-volatile computer-readable medium carrying one or more sequences of instructions for providing reliable transport of data across a network between a server on a server device and a client on a client device requesting multiple packets of content from the server, which instructions, when executed by one or more processors, cause the one or more processors to carry out the steps of:
- receiving from the server device a connection identification that is a secret number generated by the server device and used by the server device to verify that a plurality of messages received by the server device is indeed from the client device;
- detecting, by the client device only, one or more network problems based on prior exchange of data packets between the server device and the client device;
- determining at the client device only, based on considerations of the network problems, a number of packets to be sent by the server device without an acknowledgement message from the client device; and
- sending to the server device a first data packet including a first field holding data indicating the number of packets to be sent by the server device without an acknowledgement message from the client device;
- wherein the first data packet is one of the plurality of messages that each carry the connection identification;
- wherein the connection identification is carried by each message in the plurality of messages in a separate field from a sequence identifier carried by the each message; and
- wherein the server device does not perform determining the number of packets to be sent by the server device without an acknowledgement message from the client device.

13. A volatile or non-volatile computer-readable medium carrying one or more sequences of instructions for providing reliable transport of data across a network between a server on a server device and a client on a client device requesting multiple packets of content from the server, which instructions, when executed by one or more processors, cause the one or more processors to carry out the steps of:
- sending to the client device a data packet with a connection identification that is a secret number generated by the server device and used by the server device to verify that a plurality of messages received by the server device is indeed from the client device;
- receiving at the server device a first request data packet including a first field holding data indicating a number of packets to be sent by the server device without an acknowledgement message from the client device, wherein the number of packets is based on considerations of network problems at the client device;
- wherein the one or more network problem is detected, by the client device only, based on prior exchange of data packets between the server device and the client device; and
- sending one or more response data packets up to the number of data packets indicated in the first field without waiting for an acknowledgement message from the client device;
- wherein the first data packet is one of the plurality of messages that each carry the connection identification;
- wherein the connection identification is carried by each message in the plurality of messages in a separate field from a sequence identifier carried by the each message;
- wherein only the client device determines the number of packets to be sent by the server device without an acknowledgement message from the client device; and
- wherein the server device does not perform determining the number of packets to be sent by the server device without an acknowledgement message from the client device.

14. A computer apparatus for providing reliable transport of data across a network between a server on a server device and a client on a client device requesting multiple packets of content from the server, comprising:
- one or more processors;
- a means for receiving from the server device a connection identification that is a secret number generated by the server device and used by the server device to verify that a plurality of messages received by the server device is indeed from the client device;
- a means for detecting, by the client device only, one or more network problems based on prior exchange of data packets between the server device and the client device;
- a means for determining at the client device only, based on considerations of the network problems, a number of packets to be sent by the server device without an acknowledgement message from the client device; and
- a means for sending to the server device a first data packet including a first field holding data indicating the number of packets to be sent by the server device without an acknowledgement message from the client device;
- wherein the first data packet is one of the plurality of messages that each carry the connection identification;
- wherein the connection identification is carried by each message in the plurality of messages in a separate field from a sequence identifier carried by the each message; and
- wherein the server device does not perform determining the number of packets to be sent by the server device without an acknowledgement message from the client device.

15. A computer apparatus for providing reliable transport of data across a network between a server on a server device and a client on a client device requesting multiple packets of content from the server, comprising:
- one or more processors;
- a means for sending to the client device a data packet with a connection identification that is a secret number generated by the server device and used by the server device to verify that a plurality of messages received by the server device is indeed from the client device;
- a means for receiving at the server device a first request data packet including a first field holding data indicating a number of packets to be sent by the server device without an acknowledgement message from the client device, wherein the number of packets is based on considerations of network problems at the client device;
- wherein the one or more network problem is detected, by the client device only, based on prior exchange of data packets between the server device and the client device; and
- a means for sending one or more response data packets up to the number of data packets indicated in the first field without waiting for an acknowledgement message from the client device;
- wherein the first data packet is one of the plurality of messages that each carry the connection identification;
- wherein the connection identification is carried by each message in the plurality of messages in a separate field from a sequence identifier carried by the each message;
- wherein only the client device determines the number of packets to be sent by the server device without an acknowledgement message from the client device; and wherein the server device does not perform determining the number of packets to be sent by the server device without an acknowledgement message from the client device.

16. An apparatus for providing reliable transport of data across a network between a server on a server device and a client on a client device requesting multiple packets of content from the server, comprising:
    a network interface that is coupled to the network for receiving one or more packet flows therefrom;
    a processor;
    one or more stored sequences of instructions which, when executed by the processor, cause the processor to carry out the steps of:
        receiving from the server device a connection identification that is a secret number generated by the server device and used by the server device to verify that a plurality of messages received by the server device is indeed from the client device;
        detecting, by the client device only, one or more network problems based on prior exchange of data packets between the server device and the client device;
        determining at the client device only, based on considerations of the network problems, a number of packets to be sent by the server device without an acknowledgement message from the client device; and
        sending to the server device a first data packet including a first field holding data indicating the number of packets to be sent by the server device without an acknowledgement message from the client device;
        wherein the first data packet is one of the plurality of messages that each carry the connection identification;
        wherein the connection identification is carried by each message in the plurality of messages in a separate field from a sequence identifier carried by the each message; and
        wherein the server device does not perform determining the number of packets to be sent by the server device without an acknowledgement message from the client device.

17. An apparatus for providing reliable transport of data across a network between a server on a server device and a client on a client device requesting multiple packets of content from the server, comprising:
    a network interface that is coupled to the network for sending one or more packet flows thereto;
    a processor;
    one or more stored sequences of instructions which, when executed by the processor, cause the processor to carry out the steps of:
        sending to the client device a data packet with a connection identification that is a secret number generated by the server device and used by the server device to verify that a plurality of messages received by the server device is indeed from the client device;
        receiving at the server device a first request data packet including a first field holding data indicating a number of packets to be sent by the server device without an acknowledgement message from the client device, wherein the number of packets is based on considerations of network problems at the client device;
        wherein the one or more network problem is detected, by the client device only, based on prior exchange of data packets between the server device and the client device; and
        sending one or more response data packets up to the number of data packets indicated in the first field without waiting for an acknowledgement message from the client device;
        wherein the first data packet is one of the plurality of messages that each carry the connection identification;
        wherein the connection identification is carried by each message in the plurality of messages in a separate field from a sequence identifier carried by the each message;
        wherein only the client device determines the number of packets to be sent by the server device without an acknowledgement message from the client device; and
        wherein the server device does not perform determining the number of packets to be sent by the server device without an acknowledgement message from the client device.

18. A computer apparatus as recited in claim 14 wherein:
    the server device does not maintain state information about prior data packets exchanged with the client device;
    the apparatus further comprises means for receiving from the server device a second data packet with a second field holding data indicating a source identification for the content on the server; and
    said means for sending the first data packet further comprises means for including in the first data packet the second field holding data indicating the source identification for the content on the server.

19. A computer apparatus as recited in claim 18 wherein said means for sending the first data packet further comprises means for including in the first data packet a third field holding data indicating the connection identification.

20. A computer apparatus as recited in claim 18, wherein said means for sending the first data packet further comprises means for including in the first data packet a third field holding data indicating the number of data packets already received by the client device.

21. A computer apparatus as recited in claim 14, wherein:
    the apparatus further comprises means for receiving one or more data packets from the server device containing some of the content from the server; and
    said means for determining the number of packets further comprises
        means for determining a measure of time associated with receiving the one or more data packets with content from the server device; and
        means for determining the considerations of network problems based at least in part on the measure of time.

22. A computer apparatus as recited in claim 15 wherein:
    the server device does not maintain state information about prior data packets exchanged with the client device;
    the apparatus further comprises means for determining whether the first data packet includes in a second field data indicating an initial request for the content from the server; and means for determining a source identification for the content from the server, if that the second field holds data indicating the initial request; and
    said means for sending the one or more response data packets further comprises means for including in each of the one or more response data packets a third field indicating the source identification for the content from the server.

23. A computer apparatus as recited in claim 22, wherein:
    the apparatus further comprises means for extracting from a third field in the first data packet data indicating the source identification for the content from the server, if it is determined that the second field does not hold data indicating the initial request; and said means for sending the one or more response data packets further comprises means for including in each of the one or more response data packets at least some of the content from a source identified by the source identification.

24. A computer apparatus as recited in claim 23, wherein:
the second field and the third field are the same field; and
said means for determining whether the first data packet includes in the second field data indicating the initial request further comprises means for determining whether the second field holds data indicating no source identification for the content from the server.

25. A computer apparatus as recited in claim 15, said means for receiving the first data packet further comprises means for extracting from the first data packet a third field holding data indicating the number of data packets already received by the client.

26. A computer apparatus as recited in claim 22 wherein:
the apparatus further comprises means for determining the connection identification; and
said means for sending the one or more response data packets further comprises
means for including in each of the one or more response data packets a fourth field holding data indicating the connection identification.

27. An apparatus as recited in claim 16 wherein the server device does not maintain state information about prior data packets exchanged with the client device;
further comprising instructions which when executed cause receiving from the server device a second data packet with a second field holding data indicating a source identification for the content on the server; and
further comprising instructions which when executed cause including in the first data packet the second field holding data indicating the source identification for the content on the server.

28. An apparatus as recited in claim 27 wherein:
said instructions for sending the first data packet further comprise instructions which when executed cause including in the first data packet a third field holding data indicating the connection identification.

29. An apparatus as recited in claim 27, wherein said instructions for sending the first data packet further comprise instructions which when executed cause including in the first data packet a third field holding data indicating the number of data packets already received by the client device.

30. An apparatus as recited in claim 16, further comprising instructions which, when executed by the processor, cause the processor to perform receiving one or more data packets from the server device containing some of the content from the server; and said instructions for determining the number of packets further comprise
instructions which when executed cause determining a measure of time associated with receiving the one or more data packets with content from the server device; and
instructions which when executed cause determining the considerations of network problems based at least in part on the measure of time.

31. An apparatus as recited in claim 17 wherein the server device does not maintain state information about prior data packets exchanged with the client device;
further comprising instructions which, when executed by the processor, cause the processor to perform determining whether the first data packet includes in a second field data indicating an initial request for the content from the server; and determining a source identification for the content from the server, if it is determined that the second field holds data indicating the initial request; and
said instructions for sending the one or more response data packets further comprise instructions which when executed cause including in each of the one or more response data packets a third field indicating the source identification for the content from the server.

32. An apparatus as recited in claim 31, further comprising instructions which, when executed by the processor, cause the processor to perform extracting from a third field in the first data packet data indicating the source identification for the content from the server, if it is determined that the second field does not hold data indicating the initial request; and
including in each of the one or more response data packets at least some of the content from a source identified by the source identification.

33. An apparatus as recited in claim 32, wherein:
the second field and the third field are the same field; and
said instructions for determining whether the first data packet includes in the second field data indicating the initial request further comprise
instructions which when executed cause determining whether the second field holds data indicating no source identification for the content from the server.

34. An apparatus as recited in claim 17, said instructions for receiving the first data packet further comprise instructions which when executed cause extracting from the first data packet a third field holding data indicating the number of data packets already received by the client.

35. An apparatus as recited in claim 31 further comprising instructions which, when executed by the processor, cause determining the connection identification; and
including in each of the one or more response data packets a fourth field holding data indicating the connection identification.

* * * * *